Patented Mar. 17, 1942

UNITED STATES PATENT OFFICE 2,276,519

ALKALI RESISTANT COATING

Joseph L. Sherk and Corliss F. Cummins, Midland, Mich., assignors to The Dow Chemical Company, Midland, Mich., a corporation of Michigan No Drawing. Application May 26, 1939, Serial No. 275,948

6 Claims. (Cl. 260—14)

This invention relates to a composition for coating surfaces which come into contact with concentrated aqueous solutions of caustic alkalies. It relates as well to caustic alkali containers, coated with the said composition.

The number of common coating composition ingredients which are known to be resistant to attack by solutions of caustic alkalies is limited and the number of those which are insoluble in, or are not chemically decomposed by, hot concentrated caustic solutions is naturally yet smaller. Outstanding in the latter class are the organo-soluble cellulose ethers. Coatings comprising these materials have been used for protecting metallic containers and the like against attack by hot concentrated solutions of caustic alkalies. It has been found, however, that the hitherto proposed cellulose ether compositions are not satisfactory for use over prolonged periods of time, especially when they are required to protect metal surfaces against attack by caustic alkali solutions of concentrations greater than 50 per cent at temperatures which may be as high as about 120° C., because they do not remain firmly adherent under these conditions.

It is accordingly an object of this invention to provide a coating material which remains substantially intact and firmly adherent to hard surfaces during and after contact with concentrated solutions of caustic alkalies over relatively long periods of time and at elevated temperatures.

A further object is the provision of a coating composition comprising a cellulose ether which may be applied readily to equipment or containers to be used in the manufacture, storage, or transportation of the concentrated solutions of caustic alkali and which will protect the said solutions against contamination by metal over long periods.

Further objects will be apparent in the following complete description of the invention.

We attain these objects by preparing a coating composition containing as the sole film-forming ingredients as organo-soluble cellulose ether, and from 20 to 60 per cent of its weight of a heat-hardenable oil reactive phenol formaldehyde resin. These ingredients are dissolved in a lacquer solvent in a concentration suitable for application by brushing, spraying, or dipping. For example, a suitable solvent for making a spraying lacquer is the following:

| | Parts by volume |
|---|---|
| Toluene | 50 |
| Xylene | 10 |
| Ethanol | 20 |
| Butanol | 20 |

The solid ingredients are dissolved in this solvent mixture to form a solution of concentration between 18 and 24 per cent.

Similarly, a suitable solvent for making a brushing lacquer consists of 70 parts of a hydrogenated naphtha known as Solvesso No. 2 and 30 parts butanol by volume. Solutions in this solvent are suitably of concentrations between 20 and 25 per cent.

The term "organo-soluble cellulose ether" herein employed is intended to designate those cellulose ethers which dissolve in organic solvents, and more specifically, in one of the mixtures of organic solvents defined above. It is well known in the art that such ethers contain at least 2 mols of etherifying substituent in each anhydro-glucose unit of the cellulose.

After application to the metallic surface to be protected, the coating composition is heated, either by baking at a temperature between 90° and 150° C., and preferably between 100° and 130° C. for a number of hours, or by immersing the coating in a solution of hot concentrated caustic alkali at a like temperature. This heating serves to harden (or set up) the phenol formaldehyde resin constituent.

We may use any organo-soluble cellulose ether in our compositions, but we prefer to use ethyl cellulose as this derivative is commercially available in a harder, tougher form than the other cellulose ethers.

Suitable resins for use in the invention include those obtainable under the names of Super Beckacite 1001
Bakelite Resin XJ 10282
Bakelite Resin Br 3360
Bakelite Resin XR 5995
F. C. D. 100

All these resins are of the heat-hardenable oil reactive phenol formaldehyde type. Mixtures of 80 per cent of ethyl cellulose and 20 per cent of the resin, by weight, are compositions which on baking at 100° to 130° C. for 8 to 10 hours have melting points of at least 160° C. The heat-treated coatings are insoluble in common organic solvents. Further, the melting point of the composition is found to have been increased by at least 35 centigrade degrees by the baking treatment.

Cellulose ether compositions containing phenol formaldehyde resins of other than the oil reactive heat-hardenable type are unsatisfactory for the present purpose, since these compositions do not exhibit the increased resistance to the action of concentrated alkalies which is characteristic of the herein-claimed compositions—phenol formaldehyde resins other than those of the heat-hardenable oil reactive type, when mixed with a cellulose ether and subjected to the above-described baking test, give generally less than 20 centigrade degrees rise in melting point to the test composition, and the baked or heat-treated sample has generally a softening point below 160° C. These resins, when added to ethyl cellulose, may improve the adhesion characteristics of the ethyl cellulose, but they do not enhance the alkali resistance thereof, and give unsatisfactory compositions for use with concentrated alkali under conditions of alternate heating and cooling.

The melting point determination referred to in the above-described heat-hardening test is carried out using a differentially heated metal bar. A strip of the coating composition in the form of a film is laid on the bar, is left there for 60 seconds, and then lifted by holding the cooler end. The temperature of the bar is measured at the point at which the film ruptures during the lifting procedure. This temperature is taken as the melting point of the film.

It is found that the degree of alkali resistance is decreased if resins other than those of the type designated are used in the composition. The alkali resistance is similarly decreased if plasticizers are incorporated in the composition.

Compositions of the invention are particularly useful for coating containers used for shipment of caustic alkalies. Caustic soda, for example, is commonly transported in tank cars or other iron containers in the form of solutions of concentrations between 50 and 70 per cent. The containers are loaded with the caustic soda at a temperature commonly lying between 100° and 120° C. The alkali cools and hardens during transit and has to be reheated to remove it from the containers at the place of use. This heating and cooling leads to expansion and contraction of the metal walls of the containers, and this together with the rough handling such containers normally encounter, combines to set up stresses of a very high order to any interior surface coating. Unmodified cellulose ether coatings are found to fail quickly under such treatment. Similarly, plasticized cellulose ether compositions have a short life.

The effectiveness of the compositions of the invention is illustrated by the results of tests which are set forth in Table I. The coatings containing 75 parts of ethyl cellulose and 25 parts of the indicated resins were applied to polished boiler plate panels and dried. Some of the panels were baked at 120° C. for 8 hours and then immersed in caustic soda of a concentration of 70 per cent at a temperature of 120° C. In the tables, these samples are referred to as "Baked." Others were placed in the hot caustic soda immediately after drying. In the tables, these samples are referred to as "Unbaked." The plates were removed at daily intervals and immediately cooled under running water, examined for failure of the coating, and, if sound, were replaced in the caustic soda.

TABLE I

Resistance of coatings to caustic soda solutions

| Composition No. | Resin used | Treatment | Days to failure |
|---|---|---|---|
| 1 | Super Beckacite 1001 | Baked | 58 |
| 2 | Bakelite Resin BR 3360 | do | 38 |
| 3 | Bakelite Resin XJ 10282 | do | 43 |
| 4 | Bakelite Resin XR 5995 | do | 58 |
| 5 | Resin F. C. D. 100 | do | 58 |
| 6 | Resin F. C. D. 100 | Unbaked | 47 |
| 7 | Bakelite Resin XR 5995 | do | 47 |

Coatings containing pigments such as asbestine, titanium dioxide, and magnesium oxide in amounts sufficient to give opaque coatings were found to be equally as good as the clear lacquers shown in the above table. Metallic containers, such as tank cars, lined with the above compositions, and employed in concentrated caustic soda service, stand up for long periods under service conditions.

Table II shows the results of similar tests on certain compositions suggested by the prior art.

TABLE II

| Composition | Treatment | Days to failure |
|---|---|---|
| Ethyl cellulose alone | Unbaked | 10 |
| Ethyl cellulose, 70 parts Chlorinated diphenyl, 30 parts | do | 10 |
| Ethyl cellulose, 60 parts Super Beckacite 1001, 25 parts Chlorinated diphenyl, 15 parts | Baked | 30 |
| Ethyl cellulose, 75 parts Amberol Resin ST 137X, 25 parts | do | 23 |
| Ethyl cellulose, 75 parts Bakelite BR 254, 25 parts | do | 13 |

The compositions set forth in Table II are seen to be much inferior to those of the present invention. For maximum resistance to hot concentrated caustic soda under conditions of alternate heating and cooling, it is apparent that cellulose ether compositions should not be plasticized and should not contain resins other than those of the heat-hardenable oil reactive type.

The ethyl cellulose of the examples may be replaced in whole or in part by one or a mixture of other organo-soluble cellulose ethers, including, for example, propyl cellulose, butyl cellulose, benzyl cellulose, ethyl benzyl celluose, ethyl propyl cellulose, methyl butyl cellulose, and the like. Of the lot, ethyl cellulose is the most readily available and under standard test conditions is at least as resistant to hot concentrated alkalies as are the other ethers.

The caustic alkali employed in the illustrative examples has been caustic soda. The method of the invention is applicable as well to the protection of other caustic alkalies from contamination by metallic containers, or the like. Such alkalies include strong solutions of potassium hydroxide and of lithium hydroxide, against each of which the herein-described coatings are resistant.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of preserving caustic alkalies of at least 50 per cent concentration, in metallic containers, from contamination by the metallic surfaces, the steps of coating the said surfaces with a composition consisting essentially of a cellulose ether soluble in organic solvents and from 20 to 60 per cent of its weight of a heat-hardenable, oil reactive phenol formaldehyde resin, dissolved in a mutual solvent for the ether and resin, drying the coating, and heating the coated surfaces at a temperature between 90° and 150° C. to harden the composition.

2. In a method of preserving caustic alkalies of at least 50 per cent concentration, in metallic containers, from contamination by the metallic surfaces, the steps of coating the said surfaces with a composition consisting essentially of a cellulose ether soluble in organic solvents and from 20 to 60 per cent of its weight of a heat-hardenable, oil reactive phenol formaldehyde resin, dissolved in a mutual solvent for the ether and resin, drying the coating, and heating the coated surfaces at a temperature between 100° and 130° C. to harden the composition.

3. In a method of preserving caustic alkalies of at least 50 per cent concentration, in metallic containers, from contamination by the metallic surfaces, the steps of coating the said surfaces with a composition consisting essentially of an ethyl cellulose soluble in organic solvents and from 20 to 60 per cent of its weight of a heat-hardenable, oil reactive phenol formaldehyde resin, dissolved in a mutual solvent for the ether and resin, drying the coating, and heating the coated surfaces at a temperature between 90° and 150° C. to harden the composition.

4. The method as defined in claim 1, wherein the caustic alkali is caustic soda.

5. A coating composition containing as the sole film forming ingredients a cellulose ether soluble in organic solvents and from 20 to 60 per cent of its weight of a heat-hardenable, oil reactive phenol formaldehyde resin, characterized by ability to deposit a film which, when heat-hardened at temperatures between 90° and 150° C., is insoluble in organic solvents and has a melting point above 160° C. at least 35 centigrade degrees higher than that of the film before hardening.

6. The composition claimed in claim 5, wherein the cellulose ether is ethyl cellulose.

JOSEPH L. SHERK.
CORLISS F. CUMMINS.